(12) United States Patent
Liao et al.

(10) Patent No.: US 12,334,559 B2
(45) Date of Patent: Jun. 17, 2025

(54) NEGATIVE ELECTRODE MATERIAL, NEGATIVE ELECTRODE PLATE, ELECTROCHEMICAL DEVICE, AND ELECTRONIC DEVICE

(71) Applicant: NINGDE AMPEREX TECHNOLOGY LIMITED, Fujian (CN)

(72) Inventors: Qunchao Liao, Fujian (CN); Hang Cui, Fujian (CN); Yuansen Xie, Fujian (CN); Chao Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 596 days.

(21) Appl. No.: 17/690,252

(22) Filed: Mar. 9, 2022

(65) Prior Publication Data
US 2022/0199996 A1    Jun. 23, 2022

Related U.S. Application Data (63) Continuation of application No. PCT/CN2020/081305, filed on Mar. 26, 2020.

(51) Int. Cl.
*H01M 4/587* (2010.01)
*H01M 4/04* (2006.01)
(Continued)

(52) U.S. Cl.
CPC ......... *H01M 4/587* (2013.01); *H01M 4/0404* (2013.01); *H01M 4/1393* (2013.01);
(Continued)

(58) Field of Classification Search
CPC .. H01M 4/587; H01M 4/0404; H01M 4/1393; H01M 4/1395; H01M 4/364;
(Continued)

(56) References Cited

U.S. PATENT DOCUMENTS

2013/0149606 A1* 6/2013 Yasuda ............... H01G 11/26
361/516
2016/0351947 A1* 12/2016 Kamo ................ H01M 4/1391
(Continued)

FOREIGN PATENT DOCUMENTS

CN    101339987 A  *  1/2009
CN    101504980 A      8/2009
(Continued)

OTHER PUBLICATIONS

International Search Report mailed Dec. 28, 2020, in International Application No. PCT/CN2020/081305 with English translation; 8 pages.

(Continued)

*Primary Examiner* — Nicholas A Smith
*Assistant Examiner* — Kevin Nguyen
(74) *Attorney, Agent, or Firm* — Maier & Maier, PLLC (57) ABSTRACT

A negative electrode material includes a silicon-based material and a carbon material. Peaks with a shift range of 1255~1355 cm$^{-1}$ and 1575~1600 cm$^{-1}$ in a Raman spectrum of the carbon material are a D peak and a G peak respectively. Peaks with a shift range of 1255~1355 cm$^{-1}$ and 1575~1600 cm$^{-1}$ in a Raman spectrum of the silicon-based material are the D peak and the G peak respectively. A scattering peak intensity ratio of D versus G peaks of the carbon material is A, and a scattering peak intensity ratio of D versus G peaks of the silicon-based material is B. $0.15 \leq A \leq 0.9$, $0.8 \leq B \leq 2.0$, and $0.2 < B-A < 1.8$.

16 Claims, 3 Drawing Sheets

(51) Int. Cl.
*H01M 4/1393* (2010.01)
*H01M 4/1395* (2010.01)
*H01M 4/36* (2006.01)
*H01M 4/38* (2006.01)
*H01M 4/66* (2006.01)
*H01M 10/0525* (2010.01)
*H01M 4/02* (2006.01)

(52) U.S. Cl.
CPC ......... *H01M 4/1395* (2013.01); *H01M 4/364* (2013.01); *H01M 4/366* (2013.01); *H01M 4/386* (2013.01); *H01M 4/661* (2013.01); *H01M 10/0525* (2013.01); *H01M 2004/021* (2013.01); *H01M 2004/027* (2013.01)

(58) Field of Classification Search
CPC ...... H01M 4/366; H01M 4/386; H01M 4/661; H01M 2004/021; H01M 2004/027
USPC .............................................. 429/231, 231.4
See application file for complete search history.

(56) References Cited

U.S. PATENT DOCUMENTS

| | | | |
|---|---|---|---|
| 2017/0256791 A1* | 9/2017 | Kurita | C04B 35/62685 |
| 2020/0006759 A1* | 1/2020 | Ay | H01G 11/38 |
| 2024/0030452 A1* | 1/2024 | Son | H01M 4/386 |

FOREIGN PATENT DOCUMENTS

| | | | |
|---|---|---|---|
| CN | 105981203 | A | 9/2016 |
| CN | 106663807 | A | 5/2017 |
| CN | 109417163 | A | 3/2019 |
| CN | 105895892 | B | 5/2019 |
| CN | 109923708 | A | 6/2019 |
| CN | 110546789 | A | 12/2019 |
| EP | 3057157 | A1 | 8/2016 |
| JP | 2009212074 | A | 9/2009 |
| JP | 2015069762 | A | 4/2015 |
| JP | 2015149224 | A | 8/2015 |
| JP | 2020507547 | A | 3/2020 |
| KR | 10-2019-0052951 | A | 5/2019 |
| KR | 20190083613 | A * | 7/2019 |
| WO | 2015115053 | A1 | 8/2015 |
| WO | 2016017583 | A1 | 2/2016 |
| WO | 2018047939 | A1 | 3/2018 |
| WO | 2019093820 | A1 | 5/2019 |

OTHER PUBLICATIONS

Extended Search Report issued on May 30, 2022, in corresponding European Application No. 20927208.7, 6 pages.
Office Action issued on Aug. 3, 2022, in corresponding Chinese Application No. 202080006619.7, 17 pages.
Office Action issued on Aug. 23, 2022, in corresponding Japanese Application No. 2021-539889, 8 pages.
Office Action issued on Jul. 9, 2020, in corresponding Japanese Application No. 2021-539889, 4 pages.

* cited by examiner

NEGATIVE ELECTRODE MATERIAL, NEGATIVE ELECTRODE PLATE, ELECTROCHEMICAL DEVICE, AND ELECTRONIC DEVICE

CROSS-REFERENCE TO RELATED APPLICATIONS

This application is a national phase application of PCT application PCT/CN2020/081305, filed on Mar. 26, 2020, the disclosure of which is hereby incorporated by reference in its entirety.

TECHNICAL FIELD

This disclosure relates to the technical field of electronics, and in particular, to a negative electrode material, a negative electrode plate, an electrochemical device, and an electronic device.

BACKGROUND

With a theoretical specific capacity of up to 4200 mAh/g, a silicon-based material is a negative electrode material that embraces a promising prospect for being used in a next-generation electrochemical device (for example, a lithium-ion battery). However, the silicon-based material expands in volume by approximately 300% in a charge-discharge process, and is poorly conductive. For this reason, a mixture of the silicon-based material and a graphite material mixed at a specific ratio is generally used in the industry. However, such a practice can still hardly meet people's increasing requirements for a higher energy density and higher kinetics.

Currently, researchers improve kinetics of a negative electrode and suppress cycle expansion of an electrode assembly primarily by improving interface stability and conductivity of the silicon-based material. However, the improvement effect is currently not satisfactory.

SUMMARY

In view of the disadvantages of the prior art, this disclosure specifies a relationship between surface characteristics, particle distribution, and morphology of a silicon-based material and a carbon material to significantly improve the rate performance of an electrochemical device and improve cycle performance and a deformation rate of the electrochemical device.

This disclosure provides a negative electrode material, including a silicon-based material and a carbon material. Peaks with a shift range of 1255~1355 $cm^{-1}$ and 1575~1600 $cm^{-1}$ in a Raman spectrum of the carbon material are a D peak and a G peak respectively. Peaks with a shift range of 1255~1355 $cm^{-1}$ and 1575~1600 $cm^{-1}$ in a Raman spectrum of the silicon-based material are the D peak and the G peak respectively. A scattering peak intensity ratio of D versus G peaks of the carbon material is A, and a scattering peak intensity ratio of D versus G peaks of the silicon-based material is B. A and B satisfy: $0.15 \leq A \leq 0.9$, $0.8 \leq B \leq 2.0$, and $0.2 < B-A < 1.8$.

In the negative electrode material, a $D_{n50}/D_{v50}$ ratio of the carbon material is E, a $D_{n50}/D_{v50}$ ratio of the silicon-based material is F, and F is greater than E.

In the negative electrode material, a $D_{n50}/D_{v50}$ ratio of the carbon material is E ranging from 0.1 to 0.65, and/or a $D_{n50}/D_{v50}$ ratio of the silicon-based material is F ranging from 0.3 to 0.85.

In the negative electrode material, an average sphericity of the carbon material is H, an average sphericity of the silicon-based material is I, and $0.1 < I-H \leq 0.3$.

In the negative electrode material, an average sphericity of the carbon material is H ranging from 0.6 to 0.8.

In the negative electrode material, an average sphericity of the silicon-based material is I ranging from 0.8 to 1.0.

In the negative electrode material, the silicon-based material includes $SiO_xC_yM_z$, where $0 \leq x \leq 2$, $0 \leq y \leq 1$, $0 \leq z \leq 0.5$, and M represents at least one of lithium, magnesium, titanium, or aluminum; and the carbon material includes graphite.

This disclosure further provides a negative electrode plate, including: a current collector and an active material layer disposed on the current collector. The active material layer includes any of the negative electrode materials described above.

This disclosure further provides an electrochemical device, including: a positive electrode plate; a negative electrode plate; and a separator disposed between the positive electrode plate and the negative electrode plate. The negative electrode plate is the negative electrode plate described above.

This disclosure further provides an electronic device, including the electrochemical device.

By selecting the silicon-based material and the carbon material that are of an appropriate Raman spectrum intensity in the negative electrode material, this disclosure improves cycle performance, a deformation rate, and rate performance of the electrochemical device significantly.

DETAILED DESCRIPTION

The following embodiments enable a person skilled in the art to understand this application more comprehensively, but without limiting this application in any way.

As a next-generation high-specific-capacity negative electrode material, a silicon-based material (for example, a silicon-oxygen material) can significantly increase an energy density of an electrode assembly. However, the silicon-based material is poorly conductive and expands and shrinks greatly in volume in a process of intercalating and deintercalating lithium. In contrast with a pure-graphite negative electrode, a larger amount of poorly conductive binder needs to be added in the silicon-based material to maintain structural stability of the negative electrode plate. In practical applications, the silicon-based material is usually mixed with a carbon material (for example, graphite) at a specific ratio to serve as a negative electrode material. However, the mixed negative electrode material still incurs the problems of poor conductivity and large volume expansion, thereby hindering further large-scale application of the silicon-based material. In addition, the performance of the mixed negative electrode material is jointly determined by the silicon-based material and the carbon material. Simply improving the silicon-based material is unable to maximally exert the electrical performance of the negative electrode. However, currently, kinetics and cycle performance of the negative electrode are enhanced primarily by improving interface stability and conductivity of the silicon-based material, but an appropriate match of surface coating, morphology, and particle diameter between the silicon-based material and the carbon material is ignored.

By an approach of an appropriate match between the silicon-based material and the carbon material (for example, graphite), this disclosure specifies a relationship of surface structure characteristics, particle distribution, and morphology between silicon-based material particles and carbon material particles to significantly improve the cycle performance, deformation rate, and rate performance of an electrochemical device.

Some embodiments of this disclosure provide a negative electrode material. The negative electrode material includes a silicon-based material and a carbon material. In some embodiments, the silicon-based material is a silicon-oxygen particle material. In some embodiments, the silicon-based material includes $SiO_xC_yM_x$, where $0 \le x \le 2$, $0 \le y \le 1$, $0 \le z \le 0.5$, and M represents at least one of lithium, magnesium, titanium, or aluminum. In some embodiments, the silicon-based material includes at least one of silicon, a silicon-oxygen compound ($SiO_x$, where $0.5 \le x \le 1.6$), silicon-carbon compound, or a silicon alloy. In some embodiments, the carbon material in the negative electrode material includes graphite and/or graphene, and the like.

In some embodiments, peaks with a shift range of 1255~1355 $cm^{-1}$ and 1575~1600 $cm^{-1}$ in a Raman spectrum of the carbon material are a D peak and a G peak respectively. A scattering peak intensity ratio of D versus G peaks of the carbon material is A. Peaks with a shift range of 1255~1355 $cm^{-1}$ and 1575~1600 $cm^{-1}$ in a Raman spectrum of the silicon-based material are the D peak and the G peak respectively. A scattering peak intensity ratio of D versus G peaks of the silicon-based material is B. The Raman scattering peak intensity ratios of the carbon material and the silicon-based material satisfy: $0.2<B-A<1.8$, $0.15 \le A \le 0.9$, and $0.8 \le B \le 2.0$. When the Raman scattering peak intensity ratios of the carbon material and the silicon-based material satisfy $0.2<B-A<1.8$, the cycle performance and the kinetics of the negative electrode material reach the optimum level. When the difference in the Raman scattering peak intensity between a silicon-based material particle and a carbon material particle is less than 0.2, the Raman scattering peak intensity ratio of D versus G peaks of the silicon-based material is too low or the Raman scattering peak intensity ratio of D versus G peaks of the carbon material is too high. At this time, an $SP^2$ hybrid structure accounts for a relatively high percentage in a coating layer on a surface of the silicon-based particle, hinders diffusion of lithium ions, aggravates the polarization, causes precipitation of metal lithium, and brings safety hazards. An electrolytic solution can hardly infiltrate the graphite particles, thereby affecting the speed of lithium ions deintercalating from a solvent and moving to the surface of the carbon material. The negative electrode material compounded of the graphite and the silicon-based material in this way is of low kinetics, thereby aggravating the polarization of the electrode assembly during cycling and deteriorating the cycle performance. When the difference in the Raman scattering peak intensity between the silicon-based material and the carbon material is greater than 1.8, the Raman scattering peak intensity ratio of D versus G peaks of the silicon-based material is too high or the Raman scattering peak intensity ratio of D versus G peaks of the carbon material is too low. In this case, a disorder degree of the carbon coating layer on the surface of the silicon-based particle increases, thereby reducing electronic conductivity. In addition, the surface of the carbon material is overlaid with a too thick amorphous carbon coating layer that contains a large number of defects, thereby decreasing the specific capacity of the negative electrode material and affecting the energy density and first-cycle Coulombic efficiency of the electrochemical device. The negative electrode material compounded of the graphite and the silicon-based material in this way exhibits low kinetics, poor cycle performance, and low energy density.

In some embodiments, the surface of the particles of the silicon-based material contains a carbon-containing coating layer. The Raman scattering peak intensity ratio $I_{1330}/I_{1580}$ of the carbon-containing coating layer ranges from 0.8 to 2.0. In some embodiments, a thickness of the carbon-containing coating layer is 0.5 nm to 50 nm. In some embodiments, a mass of the carbon-containing coating layer of the silicon-based material is 0.1% to 10% of an aggregate mass of the silicon-based material and the carbon-containing coating layer.

In some embodiments, an average particle diameter of the silicon-based particles is 0.1 μm to 30 μm. If the average particle diameter of the silicon-based material is too small, the silicon-based material is prone to agglomerate, and more electrolytic solution will be consumed to form a solid electrolyte interphase (SEI) film due to a large specific surface area. If the average particle diameter of the silicon-based material is too large, suppression of the volume expansion of the silicon-based material will be hindered, and conductivity performance of an active material layer is prone to deteriorate. In addition, if the average particle diameter of the silicon-based material is too large, the strength of the negative electrode plate will decrease. In some embodiments, a specific surface area of the silicon-based material particles is 1.0 $m^2/g$ to 15 $m^2/g$.

In some embodiments, an amorphous carbon coating layer exists on the surface of the carbon material (for example, graphite) particles. A thickness of the amorphous carbon coating layer is 5 nm to 500 nm. In some embodiments, the Raman scattering peak intensity ratio $I_{1330}/I_{1580}$ of the carbon material (for example, graphite) particles is 0.2 to 0.9. In some embodiments, the particle diameter of the carbon material (for example, graphite) particles ranges from 0.01 μm to 80 μm, and the specific surface area is less than 30 $m^2/g$. In some embodiments, the carbon material (for example, graphite) particles may be secondary particles or a mixture of secondary particles and primary particles. In the mixture, the secondary particles account for at least 70%. In some embodiments, an orientation index (OI) value of the carbon material (for example, graphite) particles is a peak intensity ratio of a (004) peak versus a (110) peak in XRD diffraction peaks of the carbon material. The OI value of the carbon material is 1 to 30.

In some embodiments, a $D_{n50}/D_{v50}$ ratio of the carbon material is E, a $D_{n50}/D_{v50}$ ratio of the silicon-based material is F, and F is greater than E. $D_{n50}$ herein means a particle diameter measured by a laser scattering particle size analyzer when a cumulative number distribution percentage of the measured particles reaches 50% of the total number of all sample particles in a number-based particle size distribution, and $D_{v50}$ herein means a particle diameter measured by a laser scattering particle size analyzer when a cumulative volume distribution percentage of the measured particles reaches 50% of the total volume of all sample particles in a volume-based particle size distribution. The $D_{n50}/D_{v50}$ ratio represents a degree of concentration of particle distribution. The closer the value of the $D_{n50}/D_{v50}$ ratio is to 1, the more concentrated the particle size distribution. In some embodiments, when the $D_{n50}/D_{v50}$ ratio of the silicon-based material is greater than the $D_{n50}/D_{v50}$ ratio of the carbon material, the cycle performance and rate performance of the electrochemical device are higher. That is because lithiation expansion of the silicon-based material is much larger than that of the carbon material (for example, graphite). In order to reduce the stress generated during the expansion, the average particle diameter of the silicon-based material is set to be smaller than that of the carbon material particles. When the active material in the negative electrode plate includes the silicon-based material and the carbon material, the distribution of the silicon-based material particles is more concentrated than the distribution of the carbon material particles. This helps to disperse the silicon-based material particles into gaps formed by the stacking of the carbon material particles, and minimizes the impact caused by the expansion of the silicon-based material onto the overall expansion of the negative electrode plate.

In some embodiments, the $D_{n50}/D_{v50}$ ratio of the silicon-based material is F ranging from 0.3 to 0.85. The higher the $D_{n50}/D_{v50}$ ratio of the silicon-based material is, the higher the expansion performance will be when the same carbon material is used together. That is because when the distribution of the silicon-based material particles is poorly concentrated, there are a large number of oversized or undersized particles. Too small sizes of the particles increase a contact area with the electrolytic solution, give rise to more solid electrolyte interface (SEI, solid electrolyte interface) films, and consume limited reversible lithium in the electrolytic solution and the electrode assembly. The oversized particles of the silicon-based material increase the stress generated during the lithiation expansion, cause the particles of the silicon-based material to rupture, lead to exposure of a fresh interface to react with the electrolytic solution, consume reversible lithium, and deteriorate the cycle performance of the electrochemical device. In addition, the large-sized particles increase diffusion paths of lithium ions, aggravate concentration polarization, and affect the rate performance of the electrochemical device.

In some embodiments, the $D_{n50}/D_{v50}$ ratio of the carbon material is E ranging from 0.1 to 0.65. When the $D_{n50}/D_{v50}$ ratio of the carbon material is less than 0.1, there are too many fine particles and large particles in the carbon material. When there are too many fine particles, the specific surface area of the carbon material is too large, thereby reducing the first-cycle Coulombic efficiency of the electrochemical device. When there are too many large particles, a transmission distance of lithium ions is increased, thereby deteriorating the expansion and rate performance of the electrochemical device. When the $D_{n50}/D_{v50}$ ratio of the carbon material is greater than 0.65, the particle size distribution of the carbon material is too concentrated, thereby being adverse to stacking the carbon material in the negative electrode plate, increasing expansion of the electrochemical device, deteriorating electrical contact, deteriorating the cycle performance accordingly, and increasing the processing cost significantly.

In some embodiments, an average sphericity of the carbon material is H, an average sphericity of the silicon-based material is I, and $0.1 < I - H \leq 0.3$. A ratio of a shortest diameter to a longest diameter of a particle is a sphericity of the particle. The sphericity of a particle may be measured with an automatic static image analyzer. The sphericity of a sphere is 1. In some embodiments, the average sphericity of the silicon-based material is I ranging from 0.8 to 1.0. As the sphericity of the silicon-based material decreases, the capacity retention rate of the electrochemical device decreases, and the deformation rate increases. That is because the silicon-based material expands enormously during lithiation. The stress generated by the expansion ruptures the surface of the silicon-based material particles. Consequently, a fresh interface is exposed and contacts the electrolytic solution, thereby generating more SEI film, and accelerating corrosion of the silicon-based material by the electrolytic solution. The silicon-based material with a relatively high sphericity can effectively and evenly disperse the stress generated by expansion, alleviate formation of surface cracks, and reduce the speed of corroding the surface of silicon-based material.

In some embodiments, the average sphericity of the carbon material is H ranging from 0.6 to 0.8. A too high or too low sphericity of the carbon material (for example, graphite) affects electrochemical performance of the electrochemical device. When the sphericity of the carbon material is too high, the silicon-based material particles are unable to be fixed in the gaps between the carbon material particles, thereby increasing the particle shift caused during expansion and shrinkage of the silicon-based material, aggravating deformation of the electrochemical device, and causing capacity attenuation. On the other hand, when the sphericity of the carbon material is too low, anisotropy increases, thereby slowing down intercalation speed of lithium ions, and affecting the kinetics of the electrochemical device.

Figure 1:
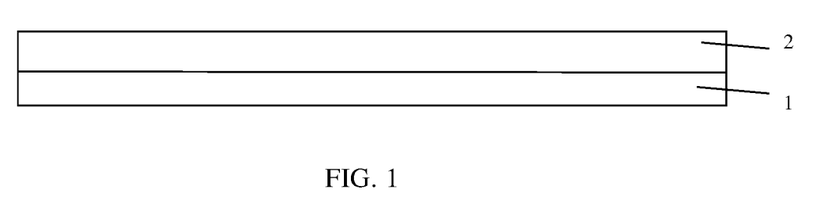
FIG. 1 is a schematic diagram of a negative electrode plate according to this disclosure.

As shown in FIG. 1, some embodiments of this disclosure provide a negative electrode plate. The negative electrode plate includes a current collector 1 and an active material layer 2. The active material layer 2 is disposed on the current collector 1. Understandably, although the active material layer 2 shown in FIG. 1 is located on one side of the current collector 1, this is merely exemplary, and the active material layer 2 may alternatively be located on both sides of the current collector 1. In some embodiments, the current collector of the negative electrode plate may include at least one of a copper foil, an aluminum foil, a nickel foil, or a carbon-based current collector. In some embodiments, the active material layer 2 includes any one of the foregoing negative electrode materials. In some embodiments, a mass percent of the silicon-based material in the active material layer is 5% to 30%.

In some embodiments, the active material layer further includes a binder and a conductive agent. In some embodiments, the binder may include at least one of carboxymethyl cellulose (CMC), polyacrylic acid, polyvinylpyrrolidone, polyaniline, polyimide, polyamideimide, polysiloxane, polystyrene butadiene rubber, epoxy resin, polyester resin, polyurethane resin, or polyfluorene. In some embodiments, a mass percent of the binder in the active material layer is 0.5% to 10%. In some embodiments, the conductive agent includes at least one of single-walled carbon nanotubes, multi-walled carbon nanotubes, vapor grown carbon fiber, nano-carbon fiber, conductive carbon black, acetylene black, Ketjen black, conductive graphite, or graphene. In some embodiments, a mass percent of the conductive agent in the active material layer is 0.5% to 5%. In some embodiments, a thickness of the active material layer is 50 μm to 200 μm. A single-side compacted density of the active material layer is 1.4 g/cm$^3$ to 1.9 g/cm$^3$. A porosity of the active material layer is 15% to 35%.

Figure 2:
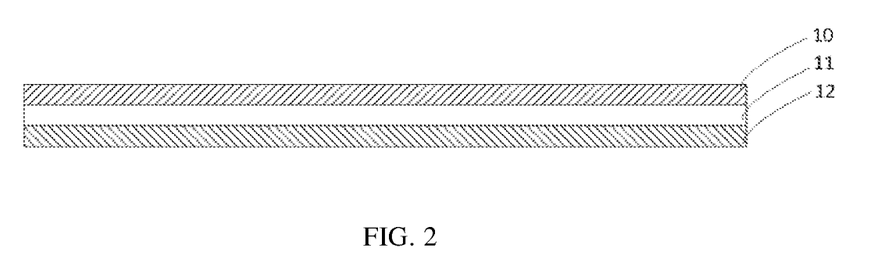
FIG. 2 is a schematic diagram of an electrode assembly of an electrochemical device according to this disclosure.

As shown in FIG. 2, some embodiments of this disclosure provide an electrochemical device. The electrochemical device includes a positive electrode plate 10, a negative electrode plate 12, and a separator 11 disposed between the positive electrode plate 10 and the negative electrode plate 12. The positive electrode plate 10 may include a positive current collector and a positive active material layer coated on the positive current collector. In some embodiments, the positive active material layer may be coated on merely a part of regions of the positive current collector. The positive active material layer may include a positive active material, a conductive agent, and a binder. The positive current collector may be an aluminum foil, or may be another positive current collector commonly used in the art. The conductive agent of the positive electrode plate may include at least one of conductive carbon black, graphite flakes, graphene, or carbon nanotubes. The binder in the positive electrode plate may include at least one of polyvinylidene fluoride, a vinylidene fluoride-hexafluoropropylene copolymer, a styrene-acrylate copolymer, styrene-butadiene copolymer, polyamide, polyacrylonitrile, polyacrylic ester, polyacrylic acid, sodium polyacrylate, sodium carboxymethyl cellulose, polyvinyl acetate, polyvinylpyrrolidone, polyvinyl ether, poly methyl methacrylate, polytetrafluoroethylene, or polyhexafluoropropylene. The positive active material includes at least one of lithium cobaltate, lithium nickelate, lithium manganate, lithium nickel manganate, lithium nickel cobaltate, lithium iron phosphate, lithium nickel cobalt aluminate, or lithium nickel cobalt manganate. The foregoing positive active materials may include doped or coated positive active materials.

In some embodiments, the separator 11 includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. Especially the polyethylene and the polypropylene are highly effective in preventing short circuits, and improve stability of the battery through a turn-off effect. In some embodiments, a thickness of the separator is in a range of approximately 5 µm-500 µm.

In some embodiments, a porous layer may be further included in a surface of the separator. The porous layer is disposed on at least one surface of the separator. The porous layer includes inorganic particles and a binder. The inorganic particles include at least one of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a diameter of a pore of the separator is in a range of approximately 0.01 µm to 1 µm. The binder includes at least one of polyvinylidene fluoride, a vinylidene fluoride-hexafluoropropylene copolymer, a polyamide, polyacrylonitrile, polyacrylic ester, polyacrylic acid, sodium polyacrylate, sodium carboxymethyl cellulose, polyvinylpyrrolidone, polyvinyl ether, poly methyl methacrylate, polytetrafluoroethylene, or polyhexafluoropropylene. The porous layer on the surface of the separator can improve heat resistance, oxidation resistance, and electrolyte infiltration performance of the separator, and enhance adhesion between the separator and the electrode plate.

In some embodiments, the negative electrode plate 12 may be the negative electrode plate described above.

In some embodiments of this disclosure, the electrode assembly of the electrochemical device is a jelly-roll electrode assembly or a stacked electrode assembly.

In some embodiments, the electrochemical device includes, but is not limited to, a lithium-ion battery. In some embodiments, the electrochemical device may further include an electrolytic solution. In some embodiments, the electrolytic solution includes at least two of dimethyl carbonate (DMC), ethyl methyl carbonate (EMC), diethyl carbonate (DEC), ethylene carbonate (EC), propylene carbonate (PC), or propyl propionate (PP). In addition, the electrolytic solution may additionally include at least one of the following as an additive to the electrolytic solution: vinylene carbonate (VC), fluoroethylene carbonate (FEC), or a dinitrile compound. In some embodiments, the electrolytic solution further includes a lithium salt.

In some embodiments of this disclosure, using a lithium-ion battery as an example, the lithium-ion battery is prepared by: winding or stacking the positive electrode plate, the separator, and the negative electrode plate sequentially into an electrode assembly, loading the electrode assembly into, for example, an aluminum laminated film for packaging, injecting an electrolytic solution, and performing formation and packaging; then performing a performance test and a cycle test on the prepared lithium-ion battery.

A person skilled in the art understands that the method for preparing the electrochemical device (for example, the lithium-ion battery) described above is merely an example. To the extent not departing from the content disclosed herein, other methods commonly used in the art may be used.

The embodiments of this disclosure further provide an electronic device that includes the foregoing electrode assembly or an electronic device that includes the foregoing electrochemical device. In some embodiments, the electronic device may include any electronic device that uses a rechargeable battery, such as a mobile phone, a tablet computer, or the like.

Some specific embodiments and comparative embodiments are enumerated below to describe this disclosure more comprehensively, using a lithium-ion battery as an example.

Embodiment 1

Preparing a negative electrode plate: Using a copper foil of 10 µm in thickness as a current collector; using $SiO_x$ ($0.5 \leq x \leq 1.6$) and graphite as active materials, peak intensity ratios of D versus G peaks of $SiO_x$ and graphite are shown in Table 1, where a mass percent of $SiO_x$ in the active materials 10%; using polyacrylic acid as a binder; mixing the active materials, conductive carbon black, and the binder at a mass ratio of 95:1.2:3.8 and then dispersing the mixture in water and stirring to form a slurry, coating the slurry onto a copper foil, and performing drying, cold-pressing, and slitting to obtain a negative electrode plate.

Preparing a positive electrode plate: Mixing $LiCoO_2$ as a positive active material, conductive carbon black, and polyvinylidene difluoride (PVDF) as a binder at a mass ratio of 96.7:1.7:1.6, thoroughly stirring and evenly mixing the mixture in an N-methyl-pyrrolidone solvent system to form a slurry, and then coating an aluminum foil with the slurry, and performing drying and cold-pressing to obtain a positive electrode plate.

Preparing a battery: Using a polyethylene porous polymer film as a separator, stacking the positive electrode plate, the separator, and the negative electrode plate sequentially, placing the separator between the positive electrode plate and the negative electrode plate to serve a function of separation, and winding them to obtain an electrode assembly. Putting the electrode assembly into an outer package that is an aluminum plastic film, injecting an electrolytic solution that contains ethylene carbonate (EC) and propylene carbonate (PC), and sealing the package; and performing steps such as chemical formation, degassing, and edge trimming to obtain a lithium-ion battery.

The preparation method of the positive electrode plate, the negative electrode plate, and the lithium-ion battery in Embodiments 2 to 17 and Comparative Embodiments 1 to 10 is the same as the preparation method in Embodiment 1 except that the surface structure, particle size distribution, and morphology of $SiO_x$ particles and graphite particles are different. Parameter differences are shown in the corresponding table.

The parameter test methods in the embodiments and comparative embodiments are described below.

Sphericity Test:

Capturing images of a specific number (greater than 5000) of dispersed particles and processing the images by using a Malvern automatic image particle size analyzer, accurately analyzing a microstructure and morphology of the particles by means of a morphologically directed Raman spectroscopy (MDRS) to obtain a longest diameter and a shortest diameter of all particles, and calculating a ratio of the shortest diameter to the longest diameter to obtain the sphericity of the particles.

Specific Surface Area Test:

Measuring an amount of a gas adsorbed on a surface of a solid under different relative pressures and a constant low temperature, and then determining a monolayer adsorption amount of a sample based on the Brunauer-Emmett-Teller adsorption theory and formula, so as to calculate a specific surface area of the solid;

$$BET \text{ formula } \frac{p}{w(P_0 - p)} = \frac{1}{W_m C} + \frac{c - 1}{W_m C} \times \frac{P}{P_0}.$$

In the formula above: W is the mass of gas adsorbed by a solid sample under a relative pressure;

$W_m$ is a saturated adsorption amount of gas that fully overlays an monolayer;

a slope is $(c-1)/(W_m C)$; an intercept distance is $1/W_m C$; and a total specific surface area is $(W_m \times N \times A_{cs}/M)$; and a specific surface area is $S = S_t/m$, where m is the mass of a sample; adsorbate cross sectional area $(A_{cs})$ is the average area occupied by each $N_2$ molecule, and is 16.2 $Å^2$ for nitrogen.

Weighing out 1.5 to 3.5 grams of powder sample, loading the sample into a TriStar II 3020 test sample tube, degassing the sample at 200° C. for 120 minutes, and then testing the sample.

Particle Size Test:

Adding approximately 0.02 gram of powder sample into a 50 ml-sized clean beaker, adding approximately 20 ml of deionized water, and adding a few drops of 1% surfactant dropwise to make the powder fully dispersed in water; ultrasonically cleaning the sample in a 120 W ultrasonic cleaning machine for 5 minutes; testing the particle size distribution by using a MasterSizer 2000; and measuring $D_{v50}$ and $D_{n50}$ separately, where $D_{v50}$ means a particle diameter measured by a laser scattering particle size analyzer when a cumulative volume distribution percentage of the measured particles reaches 50% of the total volume of all sample particles in a volume-based particle size distribution, and $D_{n50}$ means a particle diameter measured by a laser scattering particle size analyzer when a cumulative number distribution percentage of the measured particles reaches 50% of the total number of all sample particles in a number-based particle size distribution; and calculating a ratio of $D_{n50}$ to $D_{v50}$.

X-Ray Diffraction (XRD) Test:

Weighing out 1.0 to 2.0 grams of sample, pouring the sample into a groove of a glass sample holder; using a glass sheet to compact and smooth the sample, performing the XRD test by using an X-ray diffractometer (Bruker-D8) based on JJS K 0131-1996 *General Rules for X-Ray Diffractometry*; setting a test voltage to 40 kV, setting a current to 30 mA, setting a scanning angle to a value ranging from 10° to 85°, setting a scanning step length to 0.0167°, and setting the time of each step length to 0.24 s. Calculating a peak intensity ratio of the (004) peak versus the (110) peak in the XRD diffraction peaks of graphite to obtain an OI value of the graphite.

First-Cycle Coulombic Efficiency Test:

Mixing the negative electrode material, conductive carbon black, and polyacrylic acid (PAA) as a binder at a mass ratio of 80:10:10, adding deionized water, and stirring the mixture to form a slurry, coating a foil with the slurry by using a scraper until the thickness of the coating layer is 100μ, drying the foil in a vacuum drying oven at 85° C. for 12 hours, cutting the foil into discs of 1 cm in diameter in a dry environment by using a stamping machine; using a metal lithium sheet as a counter electrode in a glovebox, using a ceglard composite film as a separator, and adding an electrolytic solution to form a button battery. Performing a charge-discharge test on the battery by using a LAND series battery test system to test the charge-discharge performance of the battery.

First, discharging the battery at a current of 0.05 C until the voltage reaches 0.005 V, leaving the battery to stand for 5 minutes, and then discharging the battery at a current of 50 μA until the voltage reaches 0.005 V, and leaving the battery to stand for 5 minutes, and then discharging the battery at a current of 10 μA until the voltage reaches 0.005 V to obtain a first-cycle lithiation capacity of the material; and then charging the battery at a current of 0.1 C until the voltage reaches 2 V to obtain a first-cycle delithiation capacity. Finally, calculating a ratio of the first-cycle delithiation capacity to the first-cycle lithiation capacity to obtain the first-cycle Coulombic efficiency of the material.

Testing Cycle Performance of the Battery:

Charging the battery at a constant current of 0.7 C at a temperature of 25° C. to 45° C. until the voltage reaches 4.4 V, and then charging the battery at a constant voltage until the current reaches 0.025 C, leaving the battery to stand for 5 minutes, and then discharging the battery at a current of 0.5 C until the voltage reaches 3.0 V. Performing a cycle test in which the battery is charged at 0.7 C and discharged at 0.5 C by using the capacity obtained in this step as an initial capacity, comparing the capacity obtained in each step with the initial capacity to obtain a plurality of ratios, and obtaining a capacity attenuation curve based on the ratios. Performing charge-discharge cycles on the battery at a temperature of 25° C. until the capacity retention rate reaches 90%, and recording the number of cycles at this time as a room-temperature cycle performance indicator value of the electrode assembly; performing charge-discharge cycles at a temperature of 45° C. until the capacity retention rate reaches 80%, and recording the number of cycles at this time as a high-temperature cycle performance indicator value of the electrode assembly; and comparing the number of cycles in the foregoing two circumstances to obtain the cycle performance of the material.

Rate Performance Test:

Discharging the battery at a C-rate of 0.2 C and a temperature of 25° C. until the voltage reaches 3.0 V, and leaving the battery to stand for 5 minutes; charging the battery at 0.5 C until the voltage reaches 4.45 V, charging the battery at a constant voltage until the current reaches 0.05 C, and leaving the battery to stand for 5 minutes; adjusting the discharge rate and performing discharge tests at 0.2 C, 0.5 C, 1 C, 1.5 C, and 2.0 C respectively to obtain discharge capacities respectively; calculating a ratio of the capacity obtained at each C-rate to the capacity obtained at 0.2 C, and obtaining the rate performance by comparing the ratios calculated under the C-rates of 2 C and 0.2 C.

Deformation Rate Test:

Measuring a thickness of a half-charged fresh electrode assembly by using a spiral micrometer, performing charge-discharge cycles at 25° C. until completion of 400 cycles or performing charge-discharge cycles at 45° C. until completion of 200 cycles; when the electrode assembly is in a fully charged state, measuring the thickness of the electrode assembly at this time by using the spiral micrometer; and comparing the thickness at this time with the thickness of the fresh electrode assembly initially half charged, so as to obtain the deformation rate at this time.

The following describes the parameter settings and performance results in each embodiment and each comparative embodiment. Table 1 shows comparison between Embodiments 1 to 3 and Comparative Embodiments 1 to 2 when the Raman scattering intensity ratio of D versus G peaks of $SiO_x$ varies, and Table 2 shows the corresponding performance comparison of the full battery.

TABLE 1

| | Intensity ratio of D versus G | B-A | $D_{v50}$ | Specific surface area ($m^2 \cdot g^{-1}$) | Specific capacity* (mAh · $g^{-1}$) | First-cycle Coulombic efficiency (%) |
|---|---|---|---|---|---|---|
| Matching graphite | 0.4 | — | 14.5 | 1.05 | 355 | 93.4 |
| Embodiment 1 | 1 | 0.6 | 5.6 | 1.12 | 1681 | 69.5 |
| Embodiment 2 | 1.4 | 1.0 | 5.6 | 1.36 | 1678 | 69.1 |
| Embodiment 3 | 1.7 | 1.3 | 5.6 | 1.68 | 1679 | 68.8 |
| Comparative Embodiment 1 | 2.4 | 2.0 | 5.6 | 2.04 | 1674 | 68.4 |
| Comparative Embodiment 2 | 0.4 | 0 | 5.6 | 1.10 | 1684 | 69.4 |

*The specific capacity here is a capacity obtained when a delithiation cut-off voltage is 2.0 V (the same below).

Figure 3:
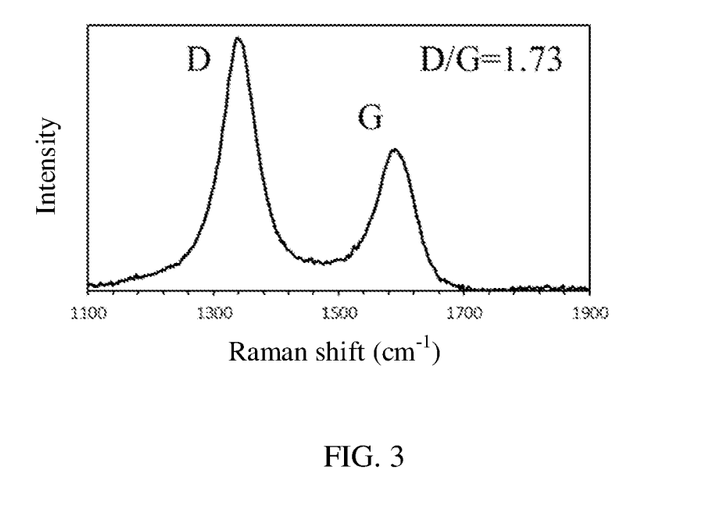
FIG. 3 is a Raman spectrum of a silicon-based material $SiO_x$ according to Embodiment 3 of this disclosure.
Figure 4:
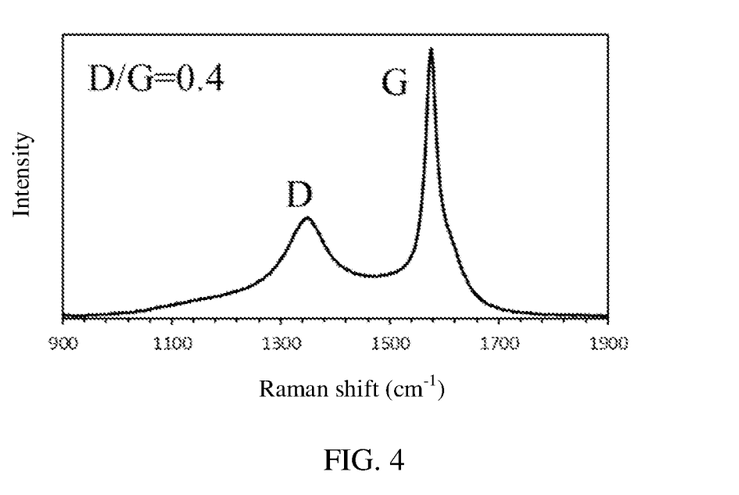
FIG. 4 is a Raman spectrum of a carbon material graphite according to Embodiment 3 of this disclosure.

In Embodiments 1 to 3 and Comparative Embodiments 1 to 2, the $SiO_x$ materials with different intensity ratios of D versus G peaks are used together with the same matching graphite. As can be seen from Table 1, a higher intensity ratio of D versus G peaks of $SiO_x$ exerts a slight impact on the specific surface area, and other parameters are basically controlled to be at the same level. FIG. 3 shows a Raman spectrum of a silicon-based material $SiO_x$ according to Embodiment 3 of this disclosure. FIG. 4 shows a Raman spectrum of a carbon material graphite according to Embodiment 3 of this disclosure.

TABLE 2

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C.) |
|---|---|---|---|---|---|
| Embodiment 1 | 88.5% | 84.5% | 8.2% | 8.5% | 86.7% |
| Embodiment 2 | 91.1% | 87.2% | 7.2% | 8.0% | 88.1% |
| Embodiment 3 | 92.6% | 88.4% | 6.4% | 7.2% | 91.1% |
| Comparative Embodiment 1 | 85.7% | 80.4% | 9.5% | 10.8% | 81.6% |
| Comparative Embodiment 2 | 75.7% | 71.3% | 6.2% | 6.8% | 82.2% |

Figure 5:
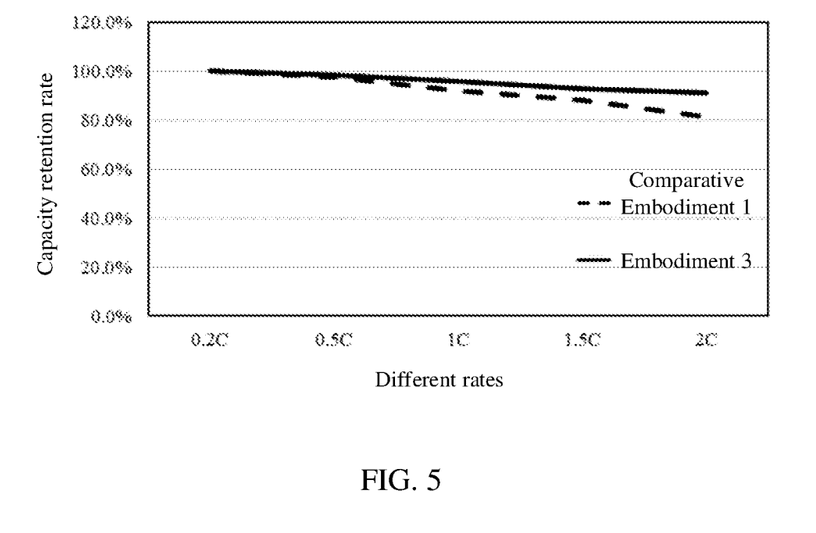
FIG. 5 is a discharge rate diagram according to Embodiment 3 and Comparative Embodiment 1 of this disclosure.

As can be seen from the electrical performance results in Embodiments 1 to 3 and Comparative Embodiments 1 and 2, when the Raman scattering peak intensity difference (B−A) between the graphite particles and the silicon-based material particles does not meet the range of 0.2 to 1.8, electrochemical performance of the electrochemical device is deteriorated significantly. When the Raman scattering peak intensity ratio of D versus G peaks of the silicon-based material particles is greater than 2.0, the disorder degree of the carbon material serving as a coating of the silicon-based material increases. Consequently, the electronic conductivity of the silicon-based material particles decreases, thereby affecting the kinetics performance of the electrochemical device. When the Raman scattering peak intensity ratio of D versus G peaks of the silicon-based material particles is too small, the percentage of the $SP^2$ hybrid structure in the carbon material coating layer increases, thereby hindering the diffusion of lithium ions, aggravating polarization, causing metal lithium to precipitate on the surface of the silicon-based material particles, and bringing safety hazards. The low deformation rate in Comparative Embodiment 2 is caused by rapid capacity attenuation and few lithium ions intercalated into the negative electrode material. FIG. 5 shows a discharge rate graph according to Embodiment 3 and Comparative Embodiment 1. The rate performance of the electrochemical device in Embodiment 3 is significantly higher than the rate performance of the electrochemical device in Comparative Embodiment 1.

Table 3 shows comparison between Embodiments 4 to 6 and Comparative Embodiments 3 to 4 when the Raman scattering intensity ratio of D versus G peaks of graphite varies, and Table 4 shows the corresponding performance comparison of the full battery.

TABLE 3

| | Intensity ratio of D versus G | B-A | $D_{v50}$ | Specific surface area ($m^2 \cdot g^{-1}$) | Specific capacity* (mAh · $g^{-1}$) | First-cycle Coulombic efficiency (%) |
|---|---|---|---|---|---|---|
| Matching $SiO_x$ | 1.7 | — | 5.6 | 1.68 | 1679 | 68.8 |
| Embodiment 4 | 0.2 | 1.5 | 14.5 | 1.20 | 355 | 93.5 |
| Embodiment 5 | 0.5 | 1.2 | 14.5 | 1.25 | 355 | 93.1 |
| Embodiment 6 | 0.8 | 0.9 | 14.5 | 1.30 | 353 | 92.8 |

TABLE 3-continued

| | Intensity ratio of D versus G | B-A | $D_{v50}$ | Specific surface area ($m^2 \cdot g^{-1}$) | Specific capacity* (mAh $\cdot$ $g^{-1}$) | First-cycle Coulombic efficiency (%) |
|---|---|---|---|---|---|---|
| 6 | | | | | | |
| Comparative Embodiment 3 | 0.01 | 1.69 | 14.5 | 1.44 | 352 | 92.3% |
| Comparative Embodiment 4 | 1.2 | 0.5 | 14.5 | 1.41 | 352 | 92.4% |

Embodiments 4 to 6 and Comparative Embodiments 3 to 4 adopt graphite with different Raman scattering intensity ratios of D versus G peaks, and other conditions are basically the same.

TABLE 4

| | 400$^{th}$-cycle capacity retention rate cycled at 25° C. | 200$^{th}$-cycle capacity retention rate cycled at 45° C. | 400$^{th}$-cycle deformation rate cycled at 25° C. | 200$^{th}$-cycle deformation rate cycled at 45° C. | Rate performance (2 C.) |
|---|---|---|---|---|---|
| Embodiment 4 | 89.1% | 86.5% | 8.0% | 8.7% | 85.7% |
| Embodiment 5 | 91.0% | 87.3% | 7.3% | 8.1% | 90.3% |
| Embodiment 6 | 88.9% | 84.6% | 8.4% | 9.2% | 89.1% |
| Comparative Embodiment 3 | 85.7% | 82.4% | 9.3% | 10.3% | 76.6% |
| Comparative Embodiment 4 | 81.7% | 79.4% | 9.8% | 11.3% | 80.6% |

As can be seen from the electrical performance results in Embodiments 4 to 6 and Comparative Embodiments 3 to 4, even if the Raman scattering peak intensity difference (B–A) between the graphite particles and the silicon-based material particles satisfies 0.2<B–A<1.8, when the Raman scattering peak intensity ratio of D versus G peaks of the graphite particles is too low (lower than 0.15), the surface of the graphite particles is not overlaid with an amorphous coating, and can hardly be infiltrated by the electrolytic solution, thereby deteriorating the kinetic performance of the electrochemical device. When the Raman scattering peak intensity ratio of D versus G peaks of the graphite particles is greater than 0.9, the surface of the graphite particles is overlaid with a too thick amorphous carbon coating layer that contains a large number of defects, thereby decreasing the first-cycle Coulombic efficiency and the specific capacity of the negative electrode material. In addition, the too thick amorphous carbon layer consumes a part of lithium ions, and leads to acceleration of capacity attenuation of the electrochemical device.

Table 5 shows comparison between Embodiments 7 to 9 and Comparative Embodiment 5 when the $D_{n50}/D_{v50}$ ratio of $SiO_x$ varies, and Table 6 shows the corresponding performance comparison of the full battery.

TABLE 5

| | $D_{n50}/D_{v50}$ | $D_{v50}$ | Specific surface area ($m^2 \cdot g^{-1}$) | Specific capacity* (mAh $\cdot$ $g^{-1}$) | First-cycle Coulombic efficiency (%) |
|---|---|---|---|---|---|
| Matching graphite | 0.2 | 13.6 | 1.18 | 355 | 93.6 |
| Embodiment 7 | 0.3 | 5.3 | 1.32 | 1679 | 68.4 |
| Embodiment 8 | 0.5 | 5.3 | 1.27 | 1681 | 68.9 |
| Embodiment 9 | 0.7 | 5.3 | 1.24 | 1678 | 69.3 |
| Comparative Embodiment 5 | 0.1 | 5.3 | 1.45 | 1665 | 67.9 |

There is no direct relationship between the $D_{n50}/D_{v50}$ ratio and $D_{v50}$. The $D_{n50}/D_{v50}$ ratio represents the concentration degree of particle size distribution, but $D_{v50}$ represents a particle diameter obtained when the cumulative volume distribution percentage of the measured particles reaches 50% of the total volume of all sample particles. Embodiments 7 to 9 differ from Comparative Embodiment 5 merely in the $D_{n50}/D_{v50}$ ratio of $SiO_x$, and there is no significant difference in other parameters.

TABLE 6

| | 400$^{th}$-cycle capacity retention rate cycled at 25° C. | 200$^{th}$-cycle capacity retention rate cycled at 45° C. | 400$^{th}$-cycle deformation rate cycled at 25° C. | 200$^{th}$-cycle deformation rate cycled at 45° C. | Rate performance (2 C.) |
|---|---|---|---|---|---|
| Embodiment 7 | 86.1% | 84.5% | 8.2% | 8.7% | 86.7% |
| Embodiment 8 | 88.0% | 87.3% | 8.0% | 8.4% | 87.3% |
| Embodiment 9 | 89.9% | 88.6% | 7.8% | 8.0% | 89.5% |
| Comparative Embodiment 5 | 81.7% | 79.4% | 9.5% | 11.0% | 82.6% |

The $D_{n50}/D_{v50}$ ratio represents the degree of concentration of particle distribution. The closer the value of the ratio is to 1, the more concentrated the particle size distribution. As can be seen from the electrical performance results of Embodiments 7 to 9 and Comparative Embodiment 5, when the $D_{n50}/D_{v50}$ ratio of $SiO_x$ is greater than the $D_{n50}/D_{v50}$ ratio of graphite, the performance of the electrochemical device is relatively high. That is because lithiation expansion of the silicon-based material is much larger than that of graphite. In order to reduce the stress generated during the expansion of the silicon-based material, the average particle diameter of the silicon-based material is set to be smaller than that of graphite. When the active material in the negative electrode plate is compounded of the silicon-based material particles and the graphite particles, the distribution of the silicon-based material particles is more concentrated than the distribution of the graphite particles. This helps to disperse the silicon-based material particles into gaps between the graphite particles, and minimizes the impact caused by the expansion of the silicon-based material onto the overall expansion of the negative electrode plate. In addition, the higher the $D_{n50}/D_{v50}$ ratio of $SiO_x$ is, the higher the cycle performance and the expansion performance of the electrochemical device will be when the same matching graphite is used together. That is because when the distribution of the silicon-based material particles is poorly concentrated, there are a large number of oversized or undersized particles. Too small sizes of the particles increase a contact area with the electrolytic solution, give rise to more SEI films, and consume limited reversible lithium in the electrolytic solution and the electrode assembly. The oversized particles increase the stress generated during the lithiation expansion, cause the particles to rupture, lead to exposure of a fresh interface to react with the electrolytic solution, consume reversible lithium, and deteriorate the cycle performance. In addition, the large-sized particles of the silicon-based material increase diffusion paths of lithium ions, aggravate concentration polarization, and affect the rate performance of the electrochemical device.

Table 7 shows comparison between Embodiments 10 to 12 and Comparative Embodiments 6 to 7 when the $D_{n50}/D_{v50}$ ratio of graphite varies, and Table 8 shows the corresponding performance comparison of the full battery.

TABLE 7

| | $D_{n50}/D_{v50}$ | $D_{v50}$ | Specific surface area $(m^2 \cdot g^{-1})$ | Specific capacity* $(mAh \cdot g^{-1})$ | First-cycle Coulombic efficiency (%) |
|---|---|---|---|---|---|
| Matching SiOx | 0.7 | 5.3 | 1.24 | 1678 | 69.3 |
| Embodiment 10 | 0.1 | 13.6 | 1.35 | 355 | 93.1 |
| Embodiment 11 | 0.3 | 13.6 | 1.32 | 355 | 93.3 |
| Embodiment 12 | 0.6 | 13.6 | 1.31 | 355 | 93.5 |
| Comparative Embodiment 6 | 0.8 | 13.6 | 1.31 | 355 | 93.5 |
| Comparative Embodiment 7 | 0.05 | 13.6 | 1.38 | 355 | 92.8 |

Embodiments 10 to 12 differ from Comparative Embodiments 6 to 7 merely in the $D_{n50}/D_{v50}$ ratio of graphite, and there is no significant difference in other parameters.

TABLE 8

| | 400$^{th}$-cycle capacity retention rate cycled at 25° C. | 200$^{th}$-cycle capacity retention rate cycled at 45° C. | 400$^{th}$ cycle deformation rate cycled at 25° C. | 200$^{th}$-cycle deformation rate cycled at 45° C. | Rate performance (2 C.) |
|---|---|---|---|---|---|
| Embodiment 10 | 87.5% | 85.6% | 8.2% | 8.5% | 87.3% |
| Embodiment 11 | 89.0% | 88.7% | 8.1% | 8.3% | 88.3% |
| Embodiment 12 | 90.9% | 89.2% | 7.6% | 8.0% | 89.9% |
| Comparative Embodiment 6 | 80.7% | 79.4% | 9.5% | 11.0% | 84.8% |
| Comparative Embodiment 7 | 82.4% | 81.2% | 9.0% | 10.1% | 84.3% |

As can be seen from the electrical performance results of Embodiments 10 to 12 and Comparative Embodiments 6 to 7, when the $D_{n50}/D_{v50}$ ratio of SiO$_x$ is greater than the $D_{n50}/D_{v50}$ ratio of graphite, the performance of the electrochemical device is relatively high. In addition, when the $D_{n50}/D_{v50}$ ratio of the graphite particles is less than 0.1, there are too many fine particles and large particles in the graphite particles. When there are too many fine particles, the specific surface area is too large, thereby reducing the first-cycle Coulombic efficiency of the electrochemical device. When there are too many large particles, a transmission distance of lithium ions is increased, thereby deteriorating the expansion and rate performance of the electrochemical device. When the $D_{n50}/D_{v50}$ ratio of the graphite particles is greater than 0.65, the particle size distribution of the graphite is too concentrated, thereby being adverse to stacking the graphite in the negative electrode plate, increasing expansion of the electrochemical device, deteriorating electrical contact, deteriorating the cycle performance accordingly, and increasing the processing cost significantly.

Table 9 shows comparison between Embodiments 13 to 15 and Comparative Embodiment 8 when the sphericity of SiO$_x$ varies, and Table 10 shows the corresponding performance comparison of the full battery.

TABLE 9

| | Sphericity | $I_{1330}/I_{1580}$ ratio | Specific surface area $(m^2 \cdot g^{-1})$ | Specific capacity* $(mAh \cdot g^{-1})$ | First-cycle Coulombic efficiency (%) |
|---|---|---|---|---|---|
| Matching graphite | 0.68 | 0.4 | 1.06 | 355 | 93.1 |
| Embodiment 13 | 0.92 | 1.6 | 1.28 | 1682 | 69.4 |
| Embodiment 14 | 0.89 | 1.6 | 1.31 | 1672 | 68.7 |
| Embodiment 15 | 0.85 | 1.6 | 1.28 | 1687 | 68.9 |
| Comparative Embodiment 8 | 0.78 | 1.6 | 1.35 | 1684 | 69.2 |

Embodiments 13 to 15 differ from Comparative Embodiment 8 merely in the sphericity of SiO$_x$, the same matching graphite is used together, and there is no significant difference in other parameters.

TABLE 10

| | 400$^{th}$-cycle capacity retention rate cycled at 25° C. | 200$^{th}$-cycle capacity retention rate cycled at 45° C. | 400$^{th}$-cycle deformation rate cycled at 25° C. | 200$^{th}$-cycle deformation rate cycled at 45° C. | Rate performance (2 C.) |
|---|---|---|---|---|---|
| Embodiment 13 | 92.5% | 89.5% | 6.2% | 7.4% | 90.7% |
| Embodiment 14 | 91.1% | 87.2% | 7.2% | 8.3% | 91.1% |
| Embodiment 15 | 89.6% | 86.4% | 8.2% | 9.2% | 89.1% |
| Comparative Embodiment 8 | 82.7% | 80.4% | 9.5% | 10.8% | 83.6% |

As can be seen from Embodiments 13 to 15 versus Comparative Embodiment 8, as the sphericity of SiO$_x$ decreases, the capacity retention rate of the electrochemical device decreases, and the deformation rate increases. That is because the SiO$_x$ expands enormously during lithiation. The stress generated by the expansion ruptures the surface of the silicon-based material particles. Consequently, a fresh interface is exposed and contacts the electrolytic solution, thereby generating more SEI film, and accelerating corrosion of the SiO$_x$ by the electrolytic solution. The SiO$_x$ with a relatively high sphericity can effectively and evenly disperse the stress generated by lithiation expansion, alleviate formation of surface cracks, reduce SEI films stacked on the surface, and decrease the speed of corroding the negative electrode material.

Table 11 shows comparison between Embodiments 13 and 16 to 17 and Comparative Embodiments 9 to 10 when the sphericity of graphite varies, and Table 12 shows the corresponding performance comparison of the full battery.

TABLE 11

| | Sphericity | $I_{1330}/I_{1580}$ ratio | Specific surface area $(m^2 \cdot g^{-1})$ | Specific capacity* $(mAh \cdot g^{-1})$ | First-cycle Coulombic efficiency (%) |
|---|---|---|---|---|---|
| Matching SiO$_x$ | 0.92 | 1.6 | 1.28 | 1682 | 69.4 |
| Embodiment 13 | 0.68 | 0.4 | 1.26 | 355 | 93.1 |
| Embodiment 16 | 0.62 | 0.4 | 1.37 | 355 | 93.2 |
| Embodiment 17 | 0.74 | 0.4 | 1.21 | 355 | 92.9 |
| Comparative Embodiment 9 | 0.84 | 0.4 | 1.38 | 355 | 92.2 |
| Comparative Embodiment 10 | 0.55 | 0.4 | 1.31 | 355 | 92.3 |

Embodiments 13, 16, and 17 differ from Comparative Embodiments 9 and 10 merely in the sphericity of the graphite, the same matching SiO$_x$ is used together, and there is no significant difference in other parameters.

TABLE 12

| | 400$^{th}$-cycle capacity retention rate cycled at 25° C. | 200$^{th}$-cycle capacity retention rate cycled at 45° C. | 400$^{th}$-cycle deformation rate cycled at 25° C. | 200$^{th}$-cycle deformation rate cycled at 45° C. | Rate performance (2 C.) |
|---|---|---|---|---|---|
| Embodiment 13 | 92.5% | 89.5% | 6.2% | 7.4% | 90.7% |
| Embodiment 16 | 91.0% | 87.1% | 6.8% | 8.3% | 89.1% |
| Embodiment 17 | 89.6% | 86.4% | 7.8% | 9.0% | 89.1% |
| Comparative Embodiment 9 | 82.7% | 80.4% | 9.5% | 10.8% | 82.6% |
| Comparative Embodiment 10 | 83.9% | 81.7% | 9.2% | 10.5% | 84.2% |

As can be seen from Embodiments 13, 16, and 17 versus Comparative Embodiments 9 and 10, a too high or too low sphericity of the graphite affects electrochemical performance of the electrochemical device. When the sphericity of the graphite is too high, the silicon-based material particles are unable to be fixed in the gaps between the graphite particles, thereby increasing the particle shift of the silicon-based material caused during expansion and shrinkage of the silicon-based material, aggravating deformation of the electrochemical device, and causing capacity attenuation. On the other hand, when the sphericity of the graphite is too low, anisotropy increases, thereby slowing down intercalation speed of lithium ions, and affecting the kinetics of the electrochemical device.

The foregoing descriptions are merely intended to describe preferred embodiments of this disclosure and the technical principles thereof. A person skilled in the art understands that the disclosure scope hereof is not limited to the technical solutions formed from specific combinations of the foregoing technical features, but covers other technical solutions formed by combining the foregoing technical features or equivalents thereof in any manner without departing from the conceptions disclosed herein. For example, the disclosure scope hereof also covers the technical solutions formed by replacing any of the foregoing features with the technical features disclosed herein and serving similar functions.

What is claimed is:

1. A negative electrode material, comprising:
a silicon-based material and a carbon material, wherein peaks with a shift range of 1255-1355 cm$^{-1}$ and 1575-1600 cm$^{-1}$ in a Raman spectrum of the carbon material are a D peak of the carbon material and a G peak of the carbon material respectively, and peaks with a shift range of 1255-1355 cm$^{-1}$ and 1575-1600 cm$^{-1}$ in a Raman spectrum of the silicon-based material are a D peak of the silicon-based material and a G peak of the silicon-based material respectively, a scattering peak intensity ratio of D versus G peaks of the carbon material is A, and a scattering peak intensity ratio of D versus G peaks of the silicon-based material is B, and wherein, $0.15 \leq A \leq 0.9$, $1.6 \leq B \leq 2.0$, and $0.2 < B-A < 1.8$.

2. The negative electrode material according to claim 1, wherein a $D_{n50}/D_{v50}$ ratio of the carbon material is E, a $D_{n50}/D_{v50}$ ratio of the silicon-based material is F, and F is greater than E.

3. The negative electrode material according to claim 1, wherein a $D_{n50}/D_{v50}$ ratio of the carbon material is E ranging from 0.1 to 0.65, and/or a $D_{n50}/D_{v50}$ ratio of the silicon-based material is F ranging from 0.3 to 0.85.

4. The negative electrode material according to claim 1, wherein an average sphericity of the carbon material is H, an average sphericity of the silicon-based material is I, and $0.1 < I-H \leq 0.3$.

5. The negative electrode material according to claim 1, wherein an average sphericity of the carbon material is H ranging from 0.6 to 0.8.

6. The negative electrode material according to claim 1, wherein an average sphericity of the silicon-based material is I ranging from 0.8 to 1.0.

7. The negative electrode material according to claim 1, wherein the silicon-based material comprises SiO$_x$C$_y$M$_z$, wherein $0 \leq x \leq 2$, $0 \leq y \leq 1$, $0 \leq z \leq 0.5$, and M represents at least one of lithium, magnesium, titanium, or aluminum; and the carbon material comprises graphite.

8. A negative electrode plate, comprising:
a current collector; and
an active material layer, disposed on the current collector, wherein
the active material layer comprises a silicon-based material and a carbon material, wherein
peaks with a shift range of 1255-1355 cm$^{-1}$ and 1575-1600 cm$^{-1}$ in a Raman spectrum of the carbon material are a D peak of the carbon material and a G peak of the carbon material respectively, and peaks with a shift range of 1255-1355 cm$^{-1}$ and 1575-1600 cm$^{-1}$ in a Raman spectrum of the silicon-based material are a D peak of the silicon-based material and a G peak of the silicon-based material respectively, a scattering peak intensity ratio of D versus G peaks of the carbon material is A, and a scattering peak intensity ratio of D versus G peaks of the silicon-based material is B, and A and B satisfy: $0.15 \leq A \leq 0.9$, $1.6 \leq B \leq 2.0$, and $0.2 < B-A < 1.8$.

9. The negative electrode plate according to claim 8, wherein a $D_{n50}/D_{v50}$ ratio of the carbon material is E, a $D_{n50}/D_{v50}$ ratio of the silicon-based material is F, and F is greater than E.

10. The negative electrode plate according to claim 8, wherein a $D_{n50}/D_{v50}$ ratio of the carbon material is E ranging from 0.1 to 0.65, and/or a $D_{n50}/D_{v50}$ ratio of the silicon-based material is F ranging from 0.3 to 0.85.

11. The negative electrode plate according to claim 8, wherein an average sphericity of the carbon material is H, an average sphericity of the silicon-based material is I, and $0.1 < I-H \leq 0.3$.

12. The negative electrode plate according to claim 8, wherein an average sphericity of the carbon material is H ranging from 0.6 to 0.8.

13. The negative electrode plate according to claim 8, wherein an average sphericity of the silicon-based material is I ranging from 0.8 to 1.0.

14. The negative electrode plate according to claim 8, wherein the silicon-based material comprises $SiO_xC_yM_z$, wherein $0 \leq x \leq 2$, $0 \leq y \leq 1$, $0 \leq z \leq 0.5$, and M represents at least one of lithium, magnesium, titanium, or aluminum; and the carbon material comprises graphite.

15. An electrochemical device, comprising:
  a positive electrode plate;
  a negative electrode plate; and
  a separator, disposed between the positive electrode plate and the negative electrode plate, wherein
  the negative electrode plate is the negative electrode plate according to claim 8.

16. An electronic device, comprising the electrochemical device according to claim 15.

* * * * *